US006287410B1

(12) United States Patent
Klemarewski

(10) Patent No.: US 6,287,410 B1
(45) Date of Patent: Sep. 11, 2001

(54) SYSTEM AND METHOD FOR MAKING COMPRESSED WOOD PRODUCT

(76) Inventor: Andrzej M. Klemarewski, 3239 Robinson Road, North Vancouver, B.C. (CA), V7J 3G1

( * ) Notice: Subject to any disclaimer, the term of this patent is extended or adjusted under 35 U.S.C. 154(b) by 0 days.

(21) Appl. No.: 09/634,700

(22) Filed: Aug. 8, 2000

Related U.S. Application Data

(60) Provisional application No. 60/140,070, filed on Jun. 21, 1999.

(51) Int. Cl.[7] .............................. B32B 31/20; B32B 31/28

(52) U.S. Cl. .................................... 156/273.7; 156/275.5; 156/275.7; 156/299; 156/300; 156/302; 156/312

(58) Field of Search .............................. 156/272.2, 273.7, 156/275.5, 275.7, 297, 299, 300, 301, 302, 311, 312, 580

(56) References Cited

U.S. PATENT DOCUMENTS

| | | | |
|---|---|---|---|
| 3,795,470 | | 3/1974 | De Mets . |
| 3,992,135 | | 11/1976 | Camp, III . |
| 4,456,498 | | 6/1984 | Churchland . |
| 4,638,843 | | 1/1987 | Sinko . |
| 5,228,947 | | 7/1993 | Churchland . |
| 5,628,860 | | 5/1997 | Shofner et al. . |
| 5,662,760 | * | 9/1997 | Tsuda ................................... 156/264 |
| 5,756,975 | | 5/1998 | Harris et al. . |
| 5,892,208 | | 4/1999 | Harris et al. . |
| 5,895,546 | | 4/1999 | Bielfeldt et al. . |
| 6,098,679 | * | 8/2000 | Go et al. .............................. 144/361 |

FOREIGN PATENT DOCUMENTS

| | | |
|---|---|---|
| 3539364A1 | 5/1987 | (DE) . |
| 957.722 | 12/1947 | (FR) . |
| 482714 | 5/1948 | (FR) . |
| 2242832 | 9/1971 | (FR) . |
| WO97/07166 | 2/1997 | (WO) . |

* cited by examiner

*Primary Examiner*—Sam Chuan Yao
(74) *Attorney, Agent, or Firm*—Kolisch, Hartwell, Dickinson, McCormack & Heuser

(57) ABSTRACT

A method and a system for producing a pressed-wood composite product from a prepared, pre-assembly mat having opposed facial expanses, and including, between such expanses, selected wood components, such as wood veneer, wood strands or other wood fibrous material, plywood sheets, lumber pieces, and further including between such wood components, inter-component heat-curable adhesive. The proposed method and system feature transporting such a pre-assembly through a processing zone, and, within that zone, creating within the pre-assembly both cyclic compression and cyclic heating. Compression is effected principally utilizing distributed pairs of opposing pinch rolls which act on transported material either through independent platens, or through surface materials which become incorporated in a final pressed-wood product. Cyclic heating is effected through use of microwave wave-guides interleaved effectively with the pressure-applying pinch rolls.

13 Claims, 2 Drawing Sheets

SYSTEM AND METHOD FOR MAKING COMPRESSED WOOD PRODUCT

CROSS REFERENCE TO RELATED APPLICATION

This application claims priority to U.S. Provisional Patent Application Ser. No. 60/140,070, filed Jun. 21, 1999 of Andrzej Marek Klemarewski for a PROCESS AND APPARATUS FOR CONTINUOUS PRESSING AND HEATING OF WOOD COMPOSITES and to Patent Cooperation Treaty Application No. PCT/IB00/00855 filed Jun. 21, 2000 of Andrzej Marek Klemarewski for a SYSTEM AND METHOD FOR MAKING COMPRESSED WOOD PRODUCT.

BACKGROUND AND SUMMARY OF THE INVENTION

This invention relates to a continuous process for producing a pressed-wood composite product from a prepared pre-assembly mat which includes selected wood components along with intercomponent, heat-curable adhesive. In particular, it relates to such a method, and also to an apparatus for implementing this method, which utilizes time-spaced stages of both pressure application and heat introduction as an approach for achieving the final integrated pressed product. Such an approach yields a superior compressed-wood product, does so with equipment which is compactly and efficiently organized, and accomplishes processing in steps which offer significant control over end-product results.

A typical end product resulting from practice of the present invention might, for example be plywood, or laminated veneer lumber (LVL), which, after production can be cut for use, or otherwise employed, in various ways as wood-based building components. The starter material, so-to-speak, which can be effectively treated by the process and the machinery of this invention, insofar as the relevant wood componentry is involved, would typically be, in addition to a suitable heat-curable adhesive, (a) thin sheet veneers of solid wood, (b) oriented strands (or other fibrous make-ups) of smaller wood components, (c) solid wood lumber of various sizes, (d) already pre-made expanses of plywood which themselves are made up of thinner layers of wood plys, or (e) other wood elements.

Describing for a moment conventional LVL fabrication processing, LVL is typically made of glued, thin, veneer sheets of natural wood, utilizing adhesives that are mostly formed of Phenol Formaldehyde formulations which require heat to complete a curing process or reaction. In the state of the art today, there are several well-known and widely practiced methods of manufacturing and processing to create LVL. The most common pressing technology involves a platen press, and a method utilizing such a press is described in U.S. Pat. No. 4,638,843. Pressing and heating is typically accomplished by placing precursor LVL between suitable heavy metal platens. These platens, and their facially "jacketed" wood-component charges, are then placed under pressure, and are heated with hot oil or steam to implement the fabrication process. Heat from the platens is slowly transferred through the wood composite product, the product shrinks and compresses under pressure to the desired final thickness, and the adhesive cures after an appropriate span of pressure/heating time. This process is relatively slow, often taking, with conventional equipment of the type generally just described, about 19-minutes or so (per unit area) to compress and cure a finished product having a final thickness of about 1.5-inches.

Recognized today in the art is the fact that the addition of suitable radiofrequency (RF) energy to the environment within (i.e., in between) opposing press platens can accelerate the heating and curing process. Accordingly, the use of this augmentive RF approach to heating can shorten fabrication times. However, there are occasions involving problems with arcing due to high voltage that is in existence with respect to such RF energy employment. Such arcing is typically exacerbated by the presence of uncured and moist adhesive which squeezes out to regions of exposure on the sides of the material being pressed. U.S. Pat. No. 5,628,860 describes an environment where this kind of situation can occur.

Another conventional process employed for the preparation of LVL is described in U.S. Pat. No. 5,895,546. This patent discusses the use of microwave energy to preheat loose LVL lay-up materials, which are then finished in a process employing a hot-oil-heated, continuous-belt press. This process avoids the RF arcing problem just mentioned above by the fact that it typically employs a significantly lower-voltage and a higher-frequency heating energy than that which is employed in an RF environment of the traditional approach. However, this type of processing still requires conventional hot-oil energy in the final pressing stage of activities. For example, a press time for the production of a final 1.5-inches product is typically here around 11- or 12-minutes (per unit area). For a much thicker product, for example, for a final LVL product with a thickness of about 3.5-inches, production time can be three or four times this length. Further, a problem often specifically associated with microwave pre-heating is that such preheating is carried out on what can be referred to as loose lay-up (pre-assembly) materials, and any line stoppage can cause adhesive to dry out and become unusable for completing product production. Further, in any situation wherein a belt press is employed, such a press is a very expensive piece of equipment, much more expensive than a platen press, and consequently, not always the most desirable machinery-route (economically) to use.

U.S. Pat. Nos. 4,456,498 and 5,228,947 disclose processes utilizing microwave energy during the adhesive curing and compression process. Such energy is applied through ceramic-covered wave-guides that are positioned in openings between continuous-belt press sections in formation machinery. This approach to production is typically limited to the production of relatively large beam materials, and thus does not have a very wide-ranging applicability. Additionally, it typically requires a higher than often desirable spread of glue, and a significant wood densification—matters which are not always particularly wanted.

In this setting, a general object of the present invention is to provide a unique, continuous-flow process, and a system for implementing the same, which offers a wide degree of versatility with respect to the fabrication of a pressed-wood composite product, utilizing extremely efficient machinery which is relatively inexpensive in comparison with prior art machinery, and which can accomplish complete fabrication and adhesive curing with a relatively low expenditure of energy, in a relatively short period of time, and with substantial adjustable control afforded over processing parameters (pressure, temperature, time) in any given "processing window" for each region in processed material. The term "processing window" is here employed to refer to the overall time during which each region in the material that is being processed is subject to the different, required processing activities. By establishing, selectively, the physical space occupied (in the system of this invention) by each processing component, continuous-flow processing is enabled in a setting where greater or lesser processing times for exposure to the specified activities furnished by any given component can be varied simply by charging/adjusting/designing the physical size of that component, as measured in the direction of material travel in the system. In addition, and very significantly, the process and system of the present invention can, in most instances, produce a resulting product which is superior to its prior art counterparts in terms of economy of manufacture, stability in final form, and ease of confident usability either as an end product, or as a precursor to yet another, future end product.

According to a preferred manner of practicing the invention, a prepared mat of preassembled wood components, and intercomponent distributions of an appropriate heat-curable adhesive, are fed in a continuous-flow manner through a processing zone wherein the mat is subjected to time-spaced intervals of compression pressure, along with time-spaced intervals of microwave-introduced heat. While, within the context of the generally unique concept of this invention involving employing such "time-spaced" activities, the specific organization of pressure and heating intervals is a matter of wide and free choice, one approach which has been found to be extremely successful in the making of, for example, LVL, is an approach which utilizes a "cyclic" application of pressure, i.e., cycles alternating between high and lower pressure as material travels through the processing zone, interspersed with "cyclic" intervals of heat introduction promoted by the use of microwave radiation which is introduced to traveling material in the regions between where high pressure is applied to the traveling material. Thus, a preferred embodiment of a system which implements this approach is one wherein a prepared mat, including selected wood components and selected intercomponent heat-curable adhesive, is fed into a region where this mat is held between suitable facial-pressure-applying "sheets" of material, such as traveling, microwave-transparent, thick platens. This overall sandwich assembly, as such travels through the processing zone created in accordance with the invention, is subjected to recurrent, intermittent cycles of the high and low pressure created by the passage of the assembly between successive adjacent pairs of adjustable pinch rolls. Microwave radiation units are placed in the regions intermediate adjacent pairs of pinch rolls, and there act to create a staged (or stepped) kind of heat build-up during the travel moments when "sandwich portions" pass from one set of pinch rolls to the next-adjacent set of such rolls. The pressure-conveying platen additionally act as a heat jackets that contribute to maintaining internal processing heat in material passing through the system.

Another approach, which very similar to the one that has just generally been described, is one wherein the mentioned microwave-transparent platens (or the like) that travel with the mat of to-be-compressed material are replaced by two, continuous, elongate, spaced and opposing jointed/scarfed sheets of wood veneer which act in the places of individual pressure platens, and which become incorporated ultimately in the finally produced LVL product.

As will become apparent, the exact organization of components used to apply pressure, and to introduce microwave heating energy, can be determined and adjusted to suit different particular fabrication requirements. But preferably, these elements according to the invention, are spaced and interspersed with one another in a kind of alternating fashion, whereby what can be thought of as the peaks of compression pressure, insofar as traveling material is concerned, are bridged by lower pressure moments that are filled with the application of microwave heating energy. Also, and preferably, that heating energy functions in a kind of "stair-step" fashion to build up the internal temperature in the forming material as such travels through the processing zone. A preferred organization of pressure-application pinch rolls, and of microwave radiators, is described herein, as are also certain modified arrangements which have been found to be quite useful in certain instances.

Another aspect of the present invention contemplates the formation of LVL and like products, and machinery for accomplishing such formation, wherein the mat of composition material which enters the processing zone mentioned above is subjected preliminarily to a stage of initial compression pressure and heating to prepare it (in a slightly different fashion) for entry into that zone. Such a modification is illustrated in one of the drawing figures herein, and is described in the text below. Other modifications are also illustrated and described.

The various features, objects and advantages that are offered and attained by the present invention will become more fully apparent as the description which now follows is read in conjunction with the accompanying drawings.

DETAILED DESCRIPTION OF, AND BEST MODE FOR CARRYING OUT, THE INVENTION

Figure 1:
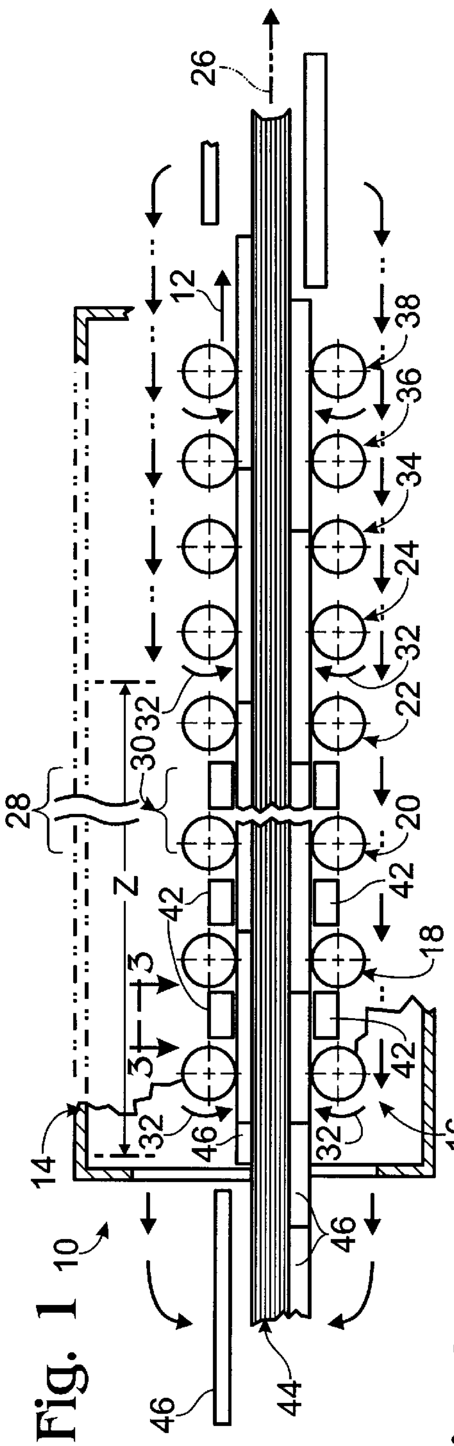
FIG. 1 is a simplified, fragmentary, side-schematic elevation of a preferred embodiment of a system constructed in accordance with the present invention, which system implements the production of a pressed-wood composite product in accordance with the method of this invention.

With attention directed now initially to FIGS. 1–4, inclusive, indicated generally at 10 in FIG. 1 is a system which is constructed in accordance with the present invention designed to produce a pressed-wood, composite LVL product employing the methodology of the invention. The left side of system 10 in FIG. 1 is the input side of the system, and the right side in this figure the output, or discharge, side of the system. As will be explained, material which is processed in system 10 flows in FIG. 1 generally from the left to the right in a continuous process, and in the direction generally of arrow 12, at a linear travel speed of about 15-feet-per-minute. The overall length of system 10 herein is about 27-feet, and overall processing time for every region of material passing through the system is less than about 2-minutes.

In particular, material which is compressed and joined to form the composite LVL product just mentioned flows through, and is processed within, a housing 14. Within this housing, upper and lower, power-driven pinch rolls, organized into pairs of vertically opposed pinch-roll pairs, such as the pinch-roll pairs shown at 16, 18, 20, 22, are distributed along the length of housing 14, generally from the left to the right sides of the housing in FIG. 1. These rolls, also referred to as power-driven transport structures define what is referred to herein as a processing path 26 for material transported through system 10. The lower pinch rolls in each pair thereof are fixed in a vertical sense on an appropriate frame (not shown) provided for system 10 within housing 14, and their respective overhead opposing rolls are mounted on this frame for independent, reversible, hydraulically-implemented, vertical adjustment so as to increase and decrease the effective nip (pinch/pressure) region between the respective pairs of rolls, thus to control processing pressure for and on material transported through the system. In the particular system now being described, there are provided, though not completely shown in FIG. 1, eleven opposing pairs of pinch rolls, of which, pairs 16, 18, 20 are the first three that are encountered by material transported through the system, and pair 22 is the eleventh pair engaged by such material. An obvious break or gap, which is drawn in the structure shown in FIG. 1 just to the right of pinchroll pair 20, and which is "closed" by brackets shown at 28, 30, has been chosen for use in FIG. 1 in order to eliminate the unnecessary over-illustration of repetitive structure.

With regard to the several pairs of pinch rolls so far mentioned, each roll in each pair has a nominal diameter of about 3½-inches, a nominal length of about 60 inches, and a defined, power-driven, rotational speed (see particularly arrows 32) sufficient to create the linear transport speed mentioned above. The center-to-center spacing between longitudinally adjacent rolls, i.e., for example, between the upper rolls in roll-pairs 16, 18, is about 8¼-inches herein, and this spacing is essentially the same between longitudinally next-adjacent rolls in the sets of rolls included in pairs 16–22, inclusive. All of the pinch rolls present in the system constitute a pressure-application structure.

The longitudinal region indicated at Z in FIG. 1 is referred to herein as a processing zone within housing 14. In this context, housing 14 is also referred to as a zone structure. It is within this zone, as will shortly be explained, that the principal compression and heat-build-up activities performed by system 10 in accordance with the invention take place.

With respect to vertical spacing which is provided nominally for the vertically opposing pinch rolls in each pair, this spacing is suitable for accommodating a stack of material designed to produce a final LVL sheet product having an overall thickness up to about 4-inches. In the particular fabrication illustration which is pictured in FIG. 1, and which will be described more fully shortly, system 10 is being employed to produce an output LVL, continuous-sheet product having a thickness of about 1½ inches.

Continuing for a moment with a description of pinch-roll mechanisms that are provided in system 10 as such is illustrated in FIG. 1, located within housing 14 downstream (i.e., toward the right side of FIG. 1) relative to pinch rolls 22, are additional pinch-roll pairs (four pairs being shown) illustrated at 24, 34, 36, 38. The particular functions of these rolls will be explained shortly. As can be seen, longitudinally adjacent rolls in these four pairs of rolls are somewhat more closely spaced than are the counterpart rolls in pairs 16–22, inclusive. Also substantially the same "smaller" longitudinal roll spacing exists between the rolls in pairs 22, 24. In particular, this somewhat different and lower spacing is herein about 7-inches.

Physically interposed each longitudinally next-adjacent pair of rolls within processing zone Z are vertically disposed pairs (ten in all) of spaced, elongate, metallic, microwave applicators (wave-guides) which are illustrated herein (three pairs only) as taking the form of elongate, rectangular blocks 42. These wave-guides are also referred to herein as heat-effecting structure, as microwave-energy radiators, and as microwave radiation structures. Each wave-guide has a length herein (a dimension extending into the plane of FIG. 1 in the drawings) of about 60-inches (like that of the pinch rolls), and appropriate horizontal and vertical cross-sectional dimensions, as such are seen particularly in FIGS. 1, 3 and 4, suitable both to allow them to nestle snugly between longitudinal next-adjacent upper and lower pinch rolls, and to perform in system 10 at the correct operating frequency and power level. In the particular system now being described, (1) the cross-sectional width of each microwave waveguide, i.e., the dimension measured longitudinally relative to zone Z (left-to-right in FIGS. 1, 3 and 4) is about 3-inches, (2) the vertical cross-sectional dimension is slightly more than 1½-inches, and (3) the wall thickness of the metal making up the waveguide is about ⅛-inches. Each wave-guide is furnished, along its side which vertically faces an opposing wave-guide (above or below), with plural, distributed, elongate slot openings, such as the openings shown at **42*a* in FIGS. 3 and 4. Each opening 42*a* has its long dimension (about 2¼-inches in depth) substantially paralleling the direction of material travel through zone Z. The width of each such opening is about ⅛-inches. The spacing between adjacent slot openings in each wave-guide is about 2½-inches, and the distribution of these openings is transverse relative to zone Z, i.e., into the planes of FIGS. 1 and 4 (and vertical in FIG. 3). The faces of the wave-guides which oppose one another are appropriately spaced vertically in zone Z in order to accommodate the maximum thickness of LVL material which is to be created in the zone, and in system 10 are spaced by about 5-inches. If desired, the wave-guides may be mounted for selective, vertical, relative movement on the frame in system 10** in order to permit relative spatial adjustment between vertically confronting wave-guides, if such is desired.

These microwave wave-guides are powered by readily conventionally available microwave equipment operating herein at one selected and appropriate frequency of 2.45-Gigahertz (another recognized appropriate frequency is 915-

Megahertz). Each is appropriately powered, in accordance with the character and thickness of material to be processed in system 10. The total heating power which is required, during travel of each region of a mat of material traveling through zone Z, to raise the curing temperature in that region to about 220° F. is about 300-kw. The wave-guides (there are twenty in all in zone Z) equally "share" the responsibility for supplying heating energy, and thus each is powered at about 15-kw.

Describing a preferred manner of operating system 10, and of practicing the present invention, a stack, or mat, of preselected, prepared, thin, solid wood veneers, such as those shown generally in a stack at 44 in FIG. 1, with each veneer having a thickness of about ⅛-inches, is laid up appropriately and conventionally at a location which is upstream from the intake end of system 10. Each veneer has a length herein of about 8-feet and a width of about 51-inches. Thirteen such veneer layers are employed in the illustration now being given, and this starting "stack", beginning with a nominal overall thickness of about 1⅝-inches, will result in an output product having a reduced, compressed thickness of about 1½-inches. Appropriate uncured coatings of a suitable, conventional Phenol Formaldehyde adhesive material are spread onto the confronting interfaces of these veneers.

In any appropriate manner, plural, independent, relatively thick, substantially microwave-transparent compression platens, such as those shown at 46, are appropriately placed on and against the underside and the top side of the stack/mat of veneers, with these platens butting against one another (relative to travel direction 12) so as to form a kind of continuum within the confines of system 10. These platens are fed into zone Z in system 10 along with the stacked veneers in the mat. While various specific sizes and materials can be chosen for platens 46, in the system now being described, each of these platens has a facial dimension of about eight feet by about 56-inches, a thickness of about ½-inch, and each is made of a fiberglass and epoxy resin matrix, such as the one made commercially available under the trademark Delmat®, which is a trademark of Von Roll Isola, France. Other platen materials having appropriate thickness and microwave transparency at the selected operating frequency of the wave-guides may, of course, be used. The platens travel through system 10 with their long axes substantially paralleling path 26.

The entire arrangement thus prepared at the intake side of system 10, i.e. the overall sandwich structure containing the adhesive-bearing veneers, and the facially abutting platens, is now passed as a continuum, with a uniform travel speed driven under the influence of the power-driven pinch rolls in the system, through zone Z in the system, and along processing path 26 from end to end in housing 14.

Figure 2:
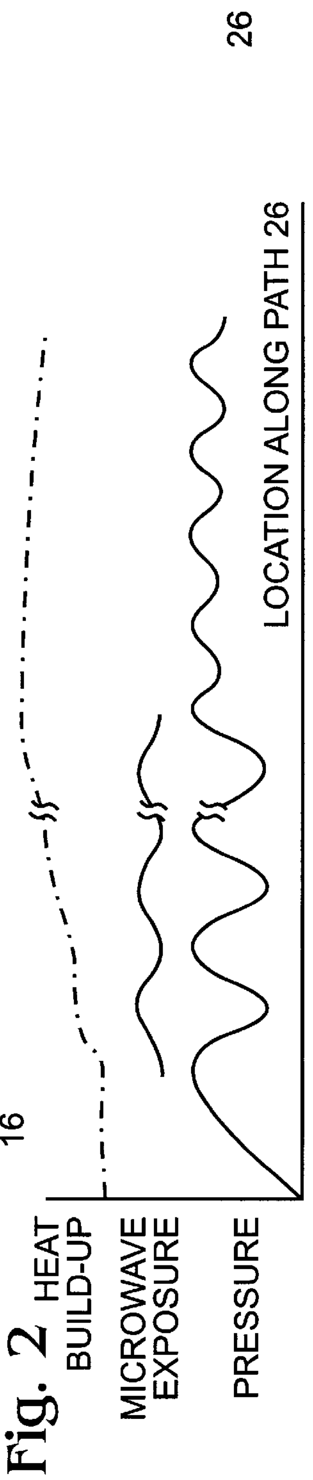
FIG. 2 is a spatially-based graph illustrating, very generally, the way in which pressure and heat build-up are applied and occur, respectively, in material fed for processing in accordance with the present invention through the system of FIG. 1.

Within processing zone Z, appropriate adjustments are made in the vertical spacings between the pinch rolls in the respective opposing pairs of pinch rolls to create the desired nip regions and related compression forces on the material being processed. The microwave wave-guides are energized so as to introduce microwave heating energy into the traveling material, all for the purpose of effecting a substantially full curing (along with compressing) of the selected composite mat material. According to an important feature of the present invention, and as can now readily be understood from a consideration of FIG. 1 in the drawings (taken along with FIG. 2), as material moves through processing zone Z, that material is subjected to time-spaced intervals of high pressure, interleaved by time-spaced intervals of lower pressure. In FIG. 2, the lowest spatial "waveform" pictured in that view generally illustrates this high-pressure/low-pressure, cyclic experience which the traveling material has as it passes through zone Z. With regard to this, one will notice that, in the regions between adjacent pairs of pinch rolls, i.e., where the microwave wave-guides are located, the material traveling in these regions also experiences plural, time-spaced intervals (or moments) of reception of microwave heating energy, which reception is represented generally by the undulating spatial wave appearing centrally (vertically, with three shown peaks and two valleys) in FIG. 2. As material travels through zone Z, and as a direct consequence of the activities of the microwave wave-guides, there is what can be thought of as a gradual, stairstep, build-up of heat within the body of the LVL-forming material to reach a final internal temperature of about 220° F. at the downstream end of zone Z. This is generally shown by the upper spatial curve in FIG. 2 which is represented by a dash-dot line in this figure.

In the particular process now being described, the peaks of pressure experienced by material traveling within zone Z, represented by the graphical peaks pictured in the lower graph in FIG. 2, are defined by pressures of about 200- to about 350-psi, and the valleys between these peaks represent pressures in the range of about 20- to about 30-psi.

Experience has shown that, following processing within zone Z, final curing is most effectively accomplished in a downstream region, i.e., the region in system 10 generally pictured in the stretch between pinch rolls 22 and pinch rolls 38, wherein, while no more microwave energy need necessarily be introduced, undulating pressure for a short span of distance and time is helpful. The pinch rolls in roll-sets 24–38, inclusive, create this kind of a final treatment environment, and between these sets of rolls, the undulating pressure experienced by each given traveling region within the processed material is pictured toward the right side of FIG. 2 in the lower curve in that figure. Here, the peak pressures lie within a range of about 150- to about 250-psi, and the valley pressures (between the peaks) within a range of about 30- to about 100-psi.

Material emerging from the discharge, right end of housing 14 in FIG. 1, takes the form of a continuous LVL sheet of material with the finally desired thickness of about ½-inches, with the same starting width of about 51-inches, and with all interfacial adhesive now essentially fully heat-cured and set. At this downstream location in system 10, in any appropriate manner, and according to an interesting approach taken and offered by the present invention as such is illustrated in FIG. 1, platens 46 are appropriately removed from contact with the opposed faces of the finished LVL product, and are returned to the intake end of the system as is generally illustrated by the upper and lower streams of dash-double-dot arrows in FIG. 1. In a manner of speaking, therefore, platens 46 follow a kind of caterpillar-tread motion along path 26, and then above and below path 26. These platens engage unprocessed or substantially unprocessed input composite material near the intake end of the system, travel with that material through the processing zone, and beyond and through the exit end of the system, and then separate to be returned for regular, recurrent use. Platen handling can be accomplished, of course, manually, but most preferably, by appropriate conveyor and material handling machinery which collects the platens at the discharge end of the system, and returns them appropriately for placement with incoming material near the intake end of the system. Such "caterpiller-tread" action offers a system capable of applying compression pressure to mat material with substantially all of the advantages of belt compression, but with essentially none of the disadvantages.

Figure 5:
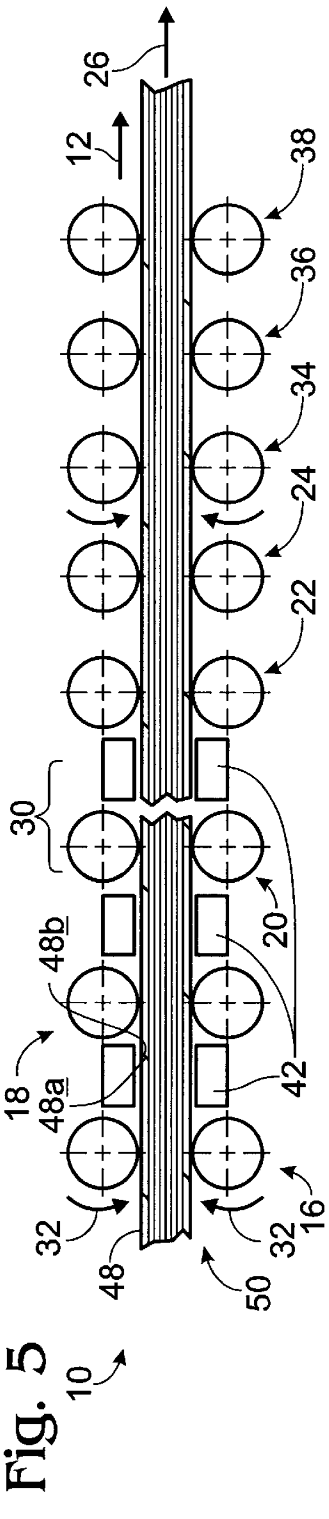
FIG. 5 is a view which is somewhat like the view presented in FIG. 1, but which shows a modified form of the invention wherein jointed/scarfed, elongate, continuous veneer sheets are employed on the opposite faces of wood-composite mat material being processed in accordance with the present invention.

Turning attention now to FIG. 5, here there is shown a modified form of system 10 wherein pressure-applying platens, like platens 46, are not employed. In substantially all other respects, the system shown in FIG. 5 is the same as that pictured in, and described with respect to, FIGS. 1–4, inclusive.

Here, in the system of FIG. 5, fed into the processing zone in the system, along with a prepared mat of stacked veneer sheets, such as the stack of veneer sheets 44 mentioned earlier, there are also provided upper and lower, wood-component facial sheets, shown in FIG. 5 at 48, 50. These sheets are continuous, conventionally jointed scarfed runs of pre-joined wood veneer expanses. In FIG. 5, two of the adhered, scarfed components in sheet 48 are shown as being next to one another at 48*a*, 48*b* on the upper side of mat 44. The scarfed-joinery glue lines between the adjacent components that make up scarfed sheets 48, 50 are substantially completely cured and dried at the time that they are introduced to form supporting facial components for the entering mat of material. Also, the material making up the scarf sheets is itself somewhat drier preferably than the veneer materials making up the interior sandwich of veneer layers. As a consequence, heating energy derived from the microwave wave-guides within zone Z functions principally to cure, as it should, the interior interfacial regions containing uncured adhesive, including, of course, the interfacial region where a scarfed facial sheet joins one of the inner layers of materials. These scarfed sheets thus, which are substantially microwave transparent, not only provide containment support for the matted material being processed in the system, but also furnish microwave-transparent, pressure-transmission functionality achieved in the FIG. 1 version of the system by platens 46. Additionally, sheet, like sheets 48, 50, supply desirable heat-jacketing for the curing material resident between them.

Figures 3, 4, 6, 7, 8, 9:
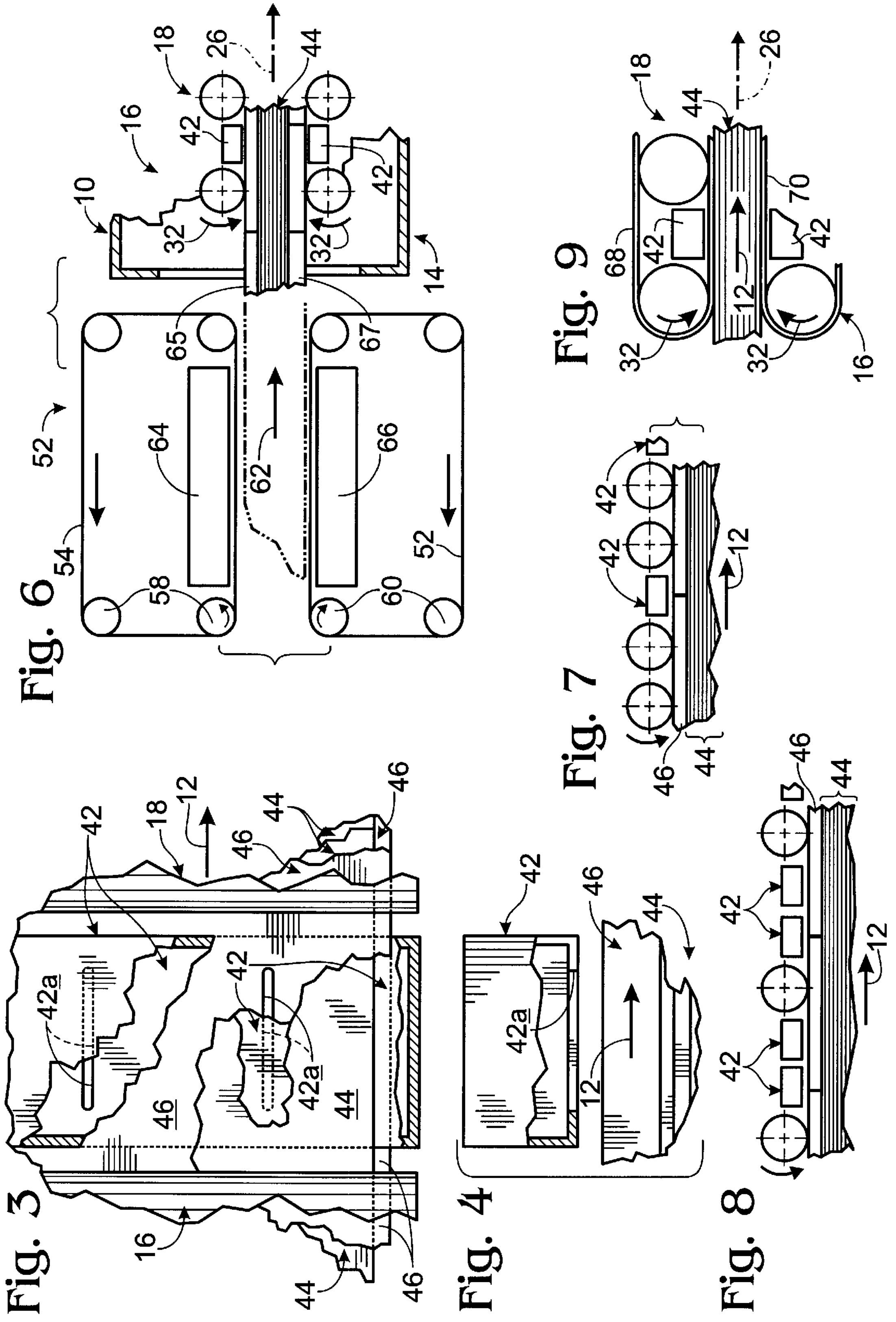
FIG. 3 is an enlarged, fragmentary view taken generally along the line 3—3 in FIG. 2, with various portions broken away to illustrate details of construction of the system of FIG. 1.
FIG. 4 is a fragmentary view taken generally along the line 4—4 in FIG. 3.
FIG. 6 is a simplified, fragmentary, schematic elevation, on about the same scale employed in FIGS. 1 and 5, showing a modified form of the system pictured in FIG. 1—modified to include a preliminary processing stage, which is designed to practice a preliminary operation wherein to-be-finally-compressed material is first subjected to a certain level of endless, traveling-belt compression, and accompanying temperature build-up.
FIGS. 7 and 8 are fragmentary side elevations, schematic in form, and similar in point of view to FIGS. 1 and 5, illustrating two different arrangements of pressure pinch rolls and microwave radiation devices which may be employed in modified practices and systems according to the invention.
FIG. 9 is a simplified, side-schematic view of yet another modified form of the invention, wherein pressure is applied to composite, precursor mat material utilizing traveling endless belts which are trained over rotating pinch rolls like those illustrated in FIG. 1.

FIG. 6 in the drawings illustrates another modified form and practice of the invention. The system partially shown here includes essentially all that is shown in FIGS. 1–4, along with an additional, preliminary processing station, shown at 52. Station 52 includes a pair (upper and lower) of otherwise conventional, endless, traveling compression belts 54, 56 trained over power-driven rollers, such as rollers 58, 60. These rollers drive the belts so that the belts possess a linear transport speed, essentially "aimed" as shown at the location, and in the direction, of arrow 62, of about 15-feet-per-minute. Acting generally as shown on belts 54, 56, respectively, are conventional, heated, relatively movable pressure platens 64, 66, respectively.

Station 52 functions as a pre-processing station which receives a prepared stack, or mat, of LVL composite material, such as the mat described in conjunction with FIG. 5, held between traveling, pre-jointed/scarfed facial sheets 65, 67, which are like previously mentioned sheets 48, 50, or prepared with butted, but yet unjoined, independent, outside facial veneer sheets which occupy locations such as those locations illustrated in FIG. 11 for platens 46. Platens are not used in this version of the invention. This station subjects such material that is about to enter system 10 to heat and compression pressure which begin to consolidate the stack, and to cure the adhesive in the outer facial layers of the stack, i.e., near to and including sheets 65, 67. Preferably, material travelling through station 52 spends about 1- to about 2-minutes moving through this station, wherein it is subjected to a fairly uniform pressure (from end-to-end through the station) in the range of about 300- to about 350-psi, and an ambient (within the station) belt temperature in the range of about 360° to about 380° F. Under these environmental conditions, preliminary compressing and consolidation takes place, especially with the result of uniting the outside layers in the stack (next to and including sheets 65, 67) which then act very much like previously discussed jointed/scarfed sheets 48, 50 as the entire mat enters and travels through system 10.

FIGS. 7 and 8 illustrate two other modified forms of the system which are illustrated in the context of modifying the system like that pictured in and described with respect to FIGS. 1–4, inclusive, and 6. Here what is illustrated are different ways of organizing the arrangements of pinch rolls and microwave wave-guides within processing zone Z. FIG. 7 specifically illustrates an arrangement wherein more than a single pinch roll is present between adjacent (longitudinally adjacent) microwave wave-guides 42. Specifically, FIG. 7 illustrates a modification wherein two adjacent pinch rolls are so provided.

FIG. 8 illustrates a situation wherein more than a single microwave wave-guide is located intermediate adjacent (longitudinally adjacent) pinch rolls, and FIG. 8 specifically shows a system wherein, between each longitudinally adjacent pinch roll, two microwave wave-guides 42 are employed.

FIG. 9 shows still another modified form of the system which can be employed in any of the other system forms so far described. Here, within the processing zone (zone Z), pinch rolls are employed to apply pressure to traveling material through appropriately stiff, endless, pressure belts, such as the two pressure belts shown at 68, 70 in FIG. 9.

There is thus proposed by the present invention a system and a method for producing a pressed-wood composite product from a prepared, pre-assembly mat which includes selected wood components and a distribution therewith of a selected, heat-curable adhesive. The invention features the transport of such a mat through a processing zone wherein the mat is subjected to different patterns of time-spaced compression time-spaced heating. Various mat formations have been described to illustrate the practice of the invention, and to suggest its scope.

Time separation, which may be cyclic time separation, involving heating and applying pressure result in a fabrication procedure, and in a system for implementing it, which is (are) extremely efficient, effective and economical. Interleaving, so-to-speak, pressure-application stations with heat-introduction stations (i.e. the sites of the microwave wave-guides in system 10) allows for the effective use of microwave energy to establish internal adhesive curing heat in a manner distributed throughout the length of the processing zone. Many of the advantages offered by the invention have been mentioned.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

It is desired to claim and secure by Letters Patent:

1. A method for producing a pressed-wood composite product from a prepared, preassembly mat having opposed facial expanses, and including, between such expanses, selected wood components, along with intercomponent, heat-curable adhesive, said method comprising transporting such a preassembly through a processing zone, and within that zone, and as the preassembly travels through the zone, subjecting the preassembly to plural, respective, time-spaced and spatially-spaced, alternating stages of compression and heating.

2. The method of claim 1, wherein the first and the last creating steps within such zone involve the application of compression pressure.

3. The method of claim 1, wherein said subjecting to heating results, in a staged, stair-step heat-built-up within the preassembly as such travels through the zone.

4. The method of claim 1 which further includes, at a location that is upstream from the processing zone, feeding such a preassembly through a heated, preliminary-processing region wherein some compression, and some precuring of adhesive in outer, opposite facial portions of the preassembly, takes place.

5. The method of claim 4, wherein said precuring takes place within an environment involving the substantially simultaneous application of compression pressure and heat to the transported preassembly.

6. The method of claim 1, wherein said subjecting to heating is accomplished through the application of microwave energy to the preassembly.

7. A method involving plural, time-spaced and spatially-spaced, alternating stages, respectively, of compression and heating for producing a pressed-wood composite product from a prepared preassembly mat including selected wood components along with intercomponent, heat-curable adhesive, said method comprising transporting such a preassembly through a processing zone, within that zone, subjecting the preassembly to such plural stages of pressure as defined by alternating higher pressure and lower pressure, and during said subjecting, applying heat to the preassembly in plural stages that are substantially intermediate the stages of pressure subsection, and in such a manner that each occurrence of said heating applying occurs during a lower-pressure portion of a pressure cycle.

8. The method of claim 7, wherein said applying of heating takes the form of subjecting the preassembly to microwave energy.

9. The method of claims 1, 2, 3, 4, 5, 6, 7 or 8, wherein cyclic compression (cycles of pressure) is (are) accomplished utilizing plural, spaced, pressure-nip regions distributed along the length of the processing zone.

10. The method of claim 9, wherein cyclic heating takes place within regions in the processing zone which are intermediate at least a selected one, or ones, of such pressure-nip regions.

11. The method of claims 1, 2, 3, 4, 5, 6, 7 or 8, wherein cyclic compression (cycles of pressure) is (are) accomplished utilizing, inter alia, elongate, continuous, spaced, generally parallel-planar surface sheets of wood-containing veneer material which become facially integrated in the completed, pressed-wood-composite product.

12. The method of claims 1, 2, 3, 4, 5, 6, 7 or 8, wherein cyclic compression (cycles of pressure) is (are) accomplished utilizing removable, stiff sheets of non-product-incorporable material which have a selected microwave transparency.

13. The method of claim 12, wherein such sheets are (1) applied to opposite facial expanses of the preassembly material at a point upstream from the processing zone, (2) travel with the preassembly through the processing zone, (3) are removed from contact with the preassembly material at a point downstream from the processing zone, and (4), are from there, returned to the first-mentioned upstream point for reuse.

* * * * *